(12) United States Patent  (10) Patent No.: US 6,587,478 B1
Huh  (45) Date of Patent: Jul. 1, 2003

(54) CELL INTERLEAVING METHOD IN ATM SWITCHING SYSTEM

(75) Inventor: Dong Seok Huh, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/443,387

(22) Filed: Nov. 19, 1999

(30) Foreign Application Priority Data

Nov. 28, 1998 (KR) .............................................. 98-51505

(51) Int. Cl.[7] .................................................. H04J 3/24
(52) U.S. Cl. ...................................... 370/474; 370/395.7
(58) Field of Search ........................... 370/395.1, 395.4, 370/395.7, 412, 465, 470, 471, 472, 473, 474, 476, 503, 536; 714/756, 774, 784

(56) References Cited

U.S. PATENT DOCUMENTS 5,600,653 A * 2/1997 Chitre et al. ................. 370/474
6,084,880 A * 7/2000 Bailey et al. ............... 370/395.2
6,449,277 B1 * 9/2002 Kim ....................... 370/395.61

* cited by examiner

*Primary Examiner*—David Vincent
(74) *Attorney, Agent, or Firm*—Fleshner & Kim, LLP

(57) ABSTRACT

Disclosed is a cell interleaving method in an ATM switching system which is capable of reducing cell loss and transmission delay suffered in a conventional cell interleaving method. The method includes the steps of: a) counting, in a sequential order, bits constituted for one or more ATM cell having a header field and an information field; b) if the counted bits correspond to the header field of the ATM cell, storing the header field; c) if the counted bits correspond to the information field of the ATM cell, repeatedly segmenting the information field in an n bit unit; d) coupling in a sequential order the bits of the header field stored in the step b) with 1st to n−1th bits in every n bits of the information field segmented in the step c) to thereby transmit the coupled result to a receiving side; e) transmitting only the nth bits which have not been transmitted in the step d) to the receiving side in a data unit; and f) transmitting bits which have not been transmitted in the steps d) and e) to the receiving side.

24 Claims, 5 Drawing Sheets

CELL INTERLEAVING METHOD IN ATM SWITCHING SYSTEM

BACKGROUND OF THE INVENTION

1. Field of the Invention

The present invention relates to an asynchronous transfer mode ("ATM") switching system, and more particularly, to a cell interleaving method in an ATM switching system.

2. Background of the Related Art

A basic function of a network is to allow a first subscriber to select a desired one of a plurality of other subscribers, form a circuit connection between the two, and facilitate a free-exchange of information. The switching system for the circuit connection is classified into "circuit switching systems," "packet switching systems," and "ATM switching systems."

The circuit switching system is a system in which a physical circuit is formed between a calling party and a called party. A switch of an exchange is set according to the number of the called party. If there is information to be transmitted to the called party, this system can transmit the information without any delay. If there is no information to be transmitted to the called party, however, the system unnecessarily occupies a circuit over which no information is being transmitted. The circuit switching system is thus applicable to a telephone, a facsimile, or a continual image transmitting device, and so on.

The packet switching system is a system in which digital information is segmented into blocks each having a predetermined size. A header containing an address number is connected to each block, thereby forming the circuit connection. The information resulting from the coupling of the header to the block is called "packet." Transmission of information thus occurs in a packet unit. Since the system selects an empty circuit to transmit the packet information and transmits only when necessary, the packet switching system is applicable to data communication for intermittent information transmission.

Finally, the ATM switching system is an advanced packet switching system that executes a packet process in a simple manner to achieve a high speed operation similar to that of the circuit switching system. Therefore, the ATM switching system can exchange various kinds of information signals in a free and effective manner, making it is applicable to a next generation communication system based upon multimedia information. The ATM switching system is used in a wire section of a mobile telephone system. For example, it can be implemented between a base station and an exchange, or between the exchange and a base station controller, excepting a radio section between a mobile terminal and the base station.

FIG. 1 is an exemplary view illustrating the basic principles of a related art ATM switching system. As shown, the digital information is segmented into a plurality of blocks, each having a predetermined length of 48 bytes. Upon information transmission, the header of 5 bytes is connected to each block. In the ATM switching system, the resulting block of 53 bytes is called a "cell."

Under the above construction, if digital information is segmented into cells, each of which is transmitted, the number of cells to be transmitted is configured to be adjustable. Hence, the system can transmit various kinds of information at different transmission rate, without any restriction. In addition, there is no need to synchronize the transmission rate of a network with the transmission rate of an information signal. Moreover, the information is transmitted only when it is generated. Thus, when no information is generated, other terminals may use the same transmission line to transmit other cells, thereby preventing unnecessary monopolization of the transmission line.

Under the ATM switching system described above, cell interleaving is executed to prevent a concentration of errors at a specific portion of the cell upon information transmission. As shown in FIG. 2, where data to be transmitted is designated from "1" to "20," the input is read in a vertical direction and the output is read in a horizontal direction. Therefore, the interleaved data is arranged in the order of data 1, 6, 11, and 16 in the horizontal direction, and is sequentially outputted.

During transmission of data after interleaving, even if all of the data arranged at a second line in a horizontal direction, that is, the data 2, 7, 12, 17 were to become corrupted, the remaining data can be outputted in the form of 1, *, 3, 4, 5, 6, *, 8, 9, 10, . . . , 19, 20. The resulting errors are decentralized. In this case, the entire data can be recovered by using various recovery methods.

FIG. 3 is a block diagram illustrating a related cell interleaving circuit for a cell header in a cell unit in the ATM switching system. As shown, the related cell interleaving is configured to insert a cell header of 40 bits (5 bytes) into an information field of 384 bits (48 bytes) at intervals of 10 bits. The reason for protecting the header through interleaving is that a cell receiving side discards the entire cell if the cell header is broken, irrespective of real data of the cell, thus necessitating cell re-transmission.

Referring to FIG. 3, the cell 1, which comprises the cell header of 40 bits and the information field of 384 bits, is stored in a buffer 2. Next, each bit of the cell header is inserted into the information field of 384bits at intervals of 10 bits via a converter 3. Thereafter, the interleaved cell 4 is multiplexed with other cells and is finally transmitted. The cell is then received at the receiving side, which deinterleaves the received cell so as to recover the original data. If the cell header of 5 bytes is broken, the receiving side discards the entire cell and requires cell re-transmission.

The related cell interleaving method is arranged such that all 53 bytes of the cell are stored in a single buffer, and each bit of the cell header is inserted into the information field of 384 bits at intervals of 10 bits. Accordingly, when data is to transmitted, a transmission delay corresponding to the time required for interleaving at least 53 bytes, i.e. one cell, is generated. The transmission delay deteriorates the speech quality in real time-based voice service or video service.

The above description is incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the invention is to reduce cell transmission delay.

Another object of the invention is to improve speech quality in real-time based voice or video service.

In order to achieve at least the above-described objects of the present invention in a whole or in parts, there is provided a method of interleaving cells in an asynchronous transfer mode (ATM) switching system, including the steps of: a)

sequentially counting bits constituted for one or more ATM cell having a header field and an information field; b) storing bits corresponding to the header field; c) repeatedly segmenting bits corresponding to the information field in an n bit unit; d) sequentially coupling one bit of the header field stored in step b with 1st to (n−1)th bits in every n bit segment of the segmented information field in step c, and outputting the coupled result; e) transmitting only nth bits which have not been transmitted in the step d to the receiving side in a data unit; and f) transmitting bits which have not been transmitted in steps d and e to the receiving side.

To further achieve the above-described objects of the present invention in a whole or in parts, there is provided an asynchronous transfer mode (ATM) switching system that includes a first buffer for storing a header field of an ATM cell, a first data converter to convert data outputted from the first buffer into a first format, a second data converter to convert nth bits of n bit segments of an information field of the ATM cell into a second format, a second buffer to store bits outputted from the second converter, and output the stored bits in the second format, and an output controller for sequentially coupling the bits of the header field stored in the first buffer with 1st to (n−1)th bits in the every n bits of the information field to thereby output the coupled result outputting only nth bits which have not been outputted in a data unit, and outputting bits which correspond to the information field and have not been outputted.

To further achieve the above-described objects of the present invention in a whole or in parts, there is provided a method of interleaving data that includes the steps of: a) identifying a first group in the data having 40 bits; b) identifying a second group in the data having 384 bits; c) identifying a third group of data from the bits of the second group of data, the third group comprising 40 segments of 8 bits each; d) sequentially combining 1st through 7th bits of each of the segments of the third group with individual bits of the first group to form 8 bit interleaved segments; and e) outputting the interleaved segments and all remaining bits.

To further achieve the above-described objects of the present invention in a whole or in parts, there is provided a method of interleaving (x+y) bits of data, including the steps of: a) identifying and storing a first group of data having x bits; b) identifying a second group of data having y bits; c) identifying a third group of data from the bits of the second group of data having x segments of n bits each; d) sequentially combining every 1st through (n−1)th bit of each of the segments of the third group with individual bits of the first group, and outputting the sequentially combined groups; e) storing an nth bit of each of the segments of the third group in a second buffer; f) outputting the remaining bits of the second group; and g) outputting the bits from the second buffer.

A cell interleaving method in an ATM switching system according to the preferred embodiment is characterized in that the transmission delay for whole data which is interleaved is reduced to the time during the interleaving of at least 5 bytes. This ensures that the speech quality can be improved in real time-based voice service or video service.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
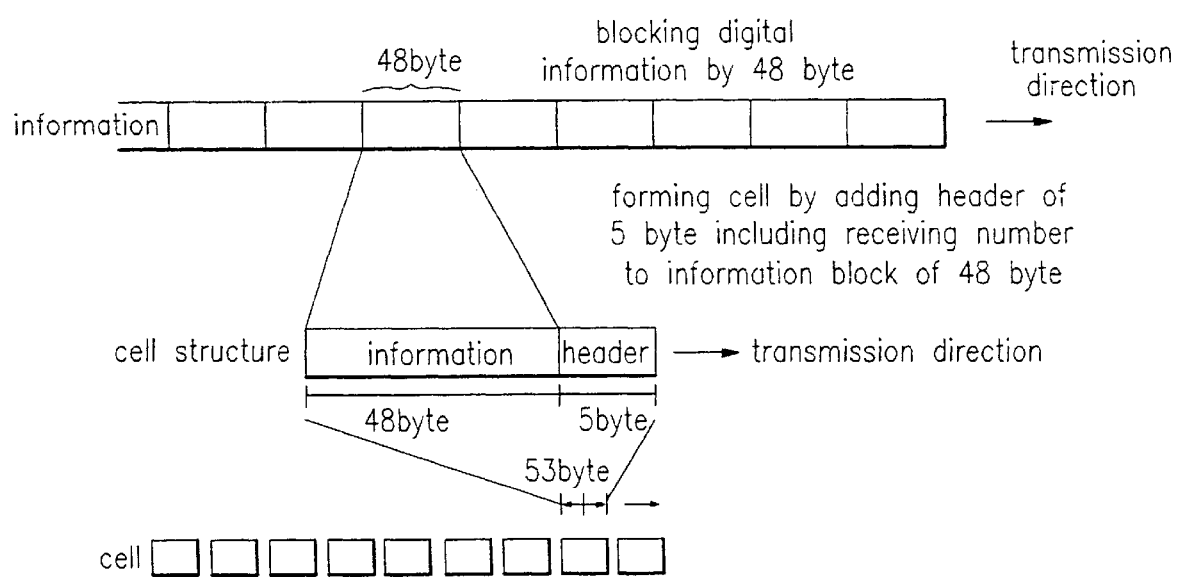
FIG. 1 is an exemplary view illustrating cell structure in a general ATM switching system.
Figure 2:
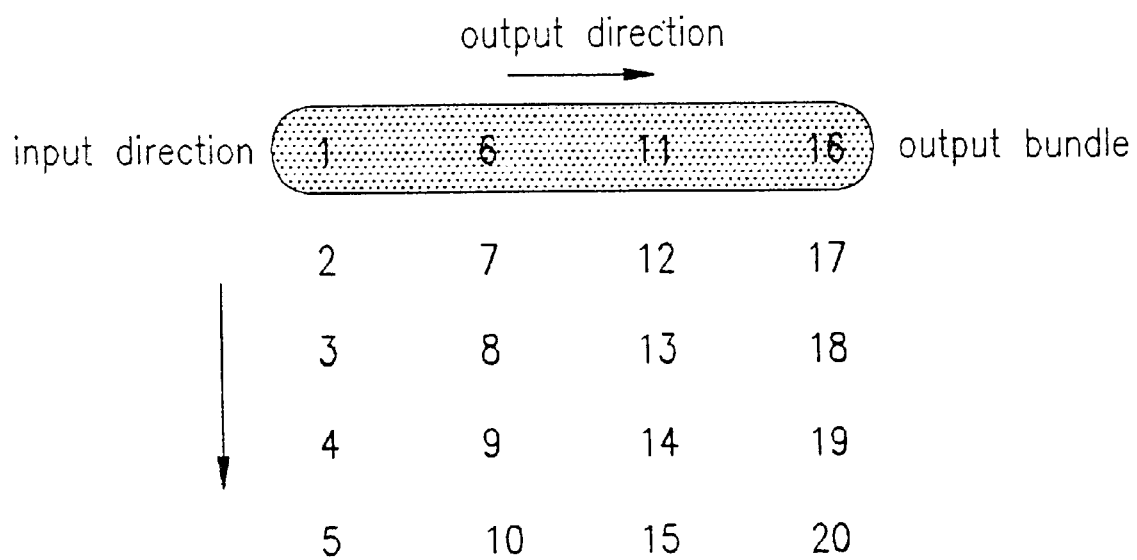
FIG. 2 is an exemplary view illustrating a general cell interleaving method.
Figure 3:
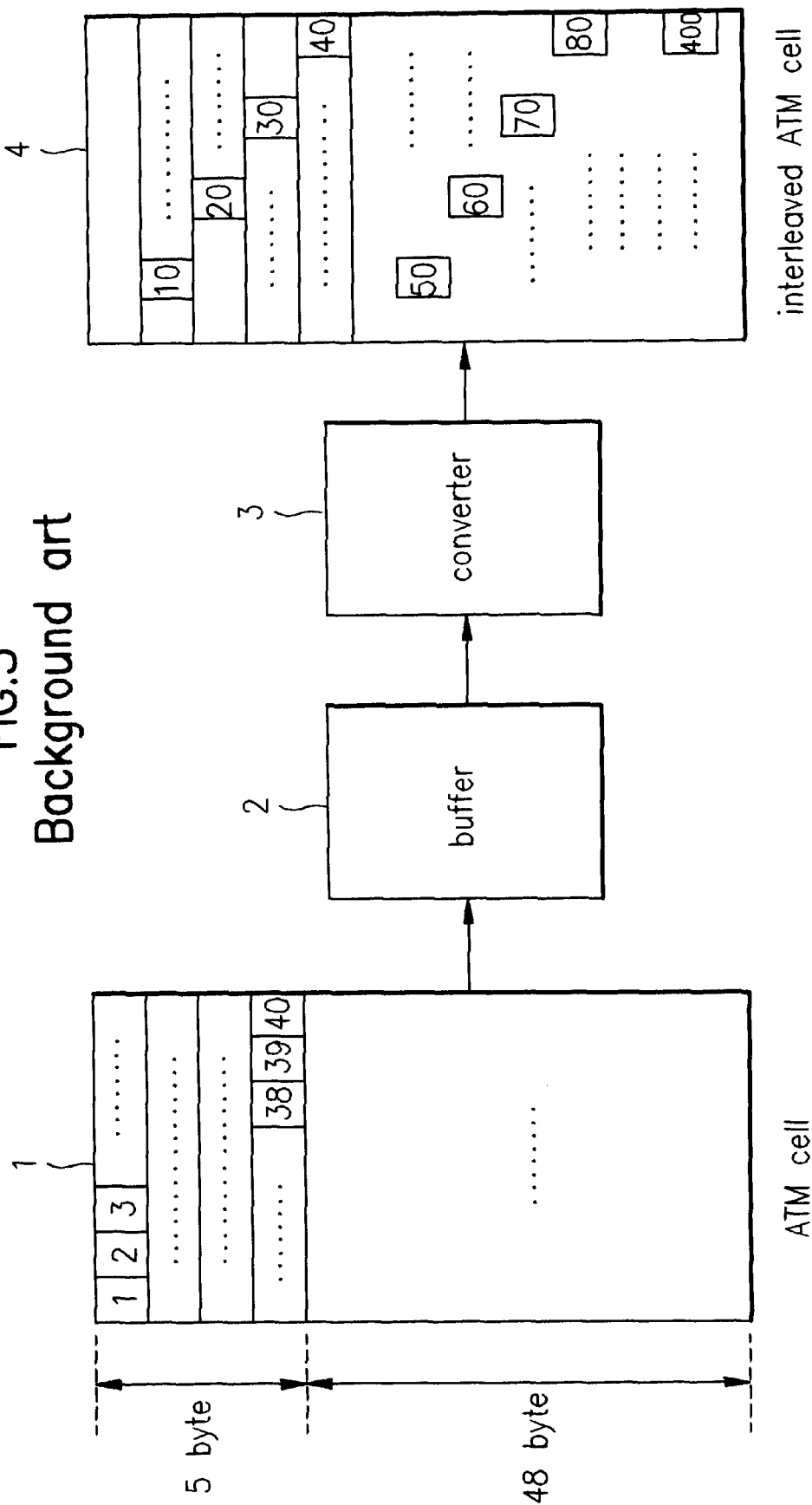
FIG. 3 is a block diagram illustrating a related art cell interleaving circuit for a cell header in a cell unit in an ATM switching system.
Figure 4:
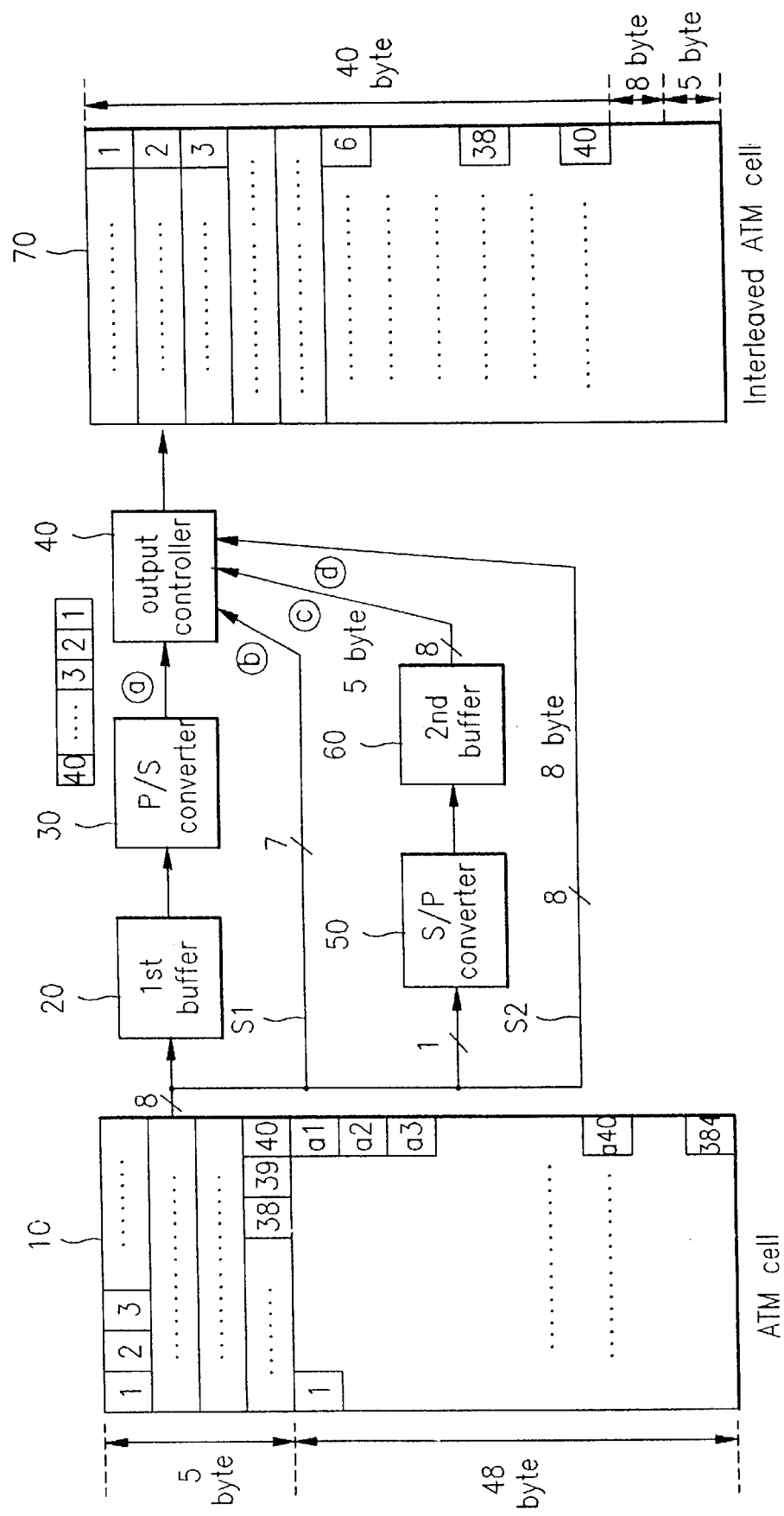
FIG. 4 is a block diagram illustrating a preferred embodiment of a cell interleaving system in an ATM switching system according to the present invention.

FIG. 4 illustrates a preferred embodiment of a cell interleaving system for a cell header in a cell unit in an ATM switching system according to the present invention. As shown therein, the cell interleaving system includes a first buffer 20 for storing the header of 5 bytes in a cell 10 of 53 bytes and a parallel-to-serial converter 30 for converting the header data outputted in parallel (eight (8) bit units) from the first buffer 20 into serial data. The system also includes a serial-to-parallel converter 50 for converting every 8th bit of the 1st to 320th bits in the information field of 384 bits into parallel data and a second buffer 60 for storing the outputted bits of the serial-to-parallel converter 50. The serial-to-parallel converter 50 outputs the stored bits as parallel data.

An output controller 40 couples the first 7 bits of each of the 48 bytes (1st to 320th bits) in the information field of the cell 10 with a corresponding single bit outputted from the parallel-to-serial converter 30. The coupled result is transmitted to a receiving side. Next, the output controller sequentially transmits the 321st to 384th bits in the 8 bit units in the information field of the cell 10, and sequentially transmits the information fields a1 to a40 stored in the second buffer 60 to the receiving side.

The bits of cell 10, which are inputted as shown in FIG. 4, are counted using a Field Programmable Gate Array (FPGA). The FPGA can be either software or hardware controlled. The header of 40 bits of the cell 10 is sent to the first buffer 20. The 1st to 320th bits in the information field of 384 bits are segmented into groups of 8 bits, in which every 1st to 7th bit in each 8 bits segment is sent to the output controller 40, and at the same time, every 8th bit in each 8 bit segmented is sent to the serial-to-parallel converter 50. Finally, the 321st to 384th bits in the information field of 384 bits of the cell 10 are sent straight to the output controller 40.

Figure 5:
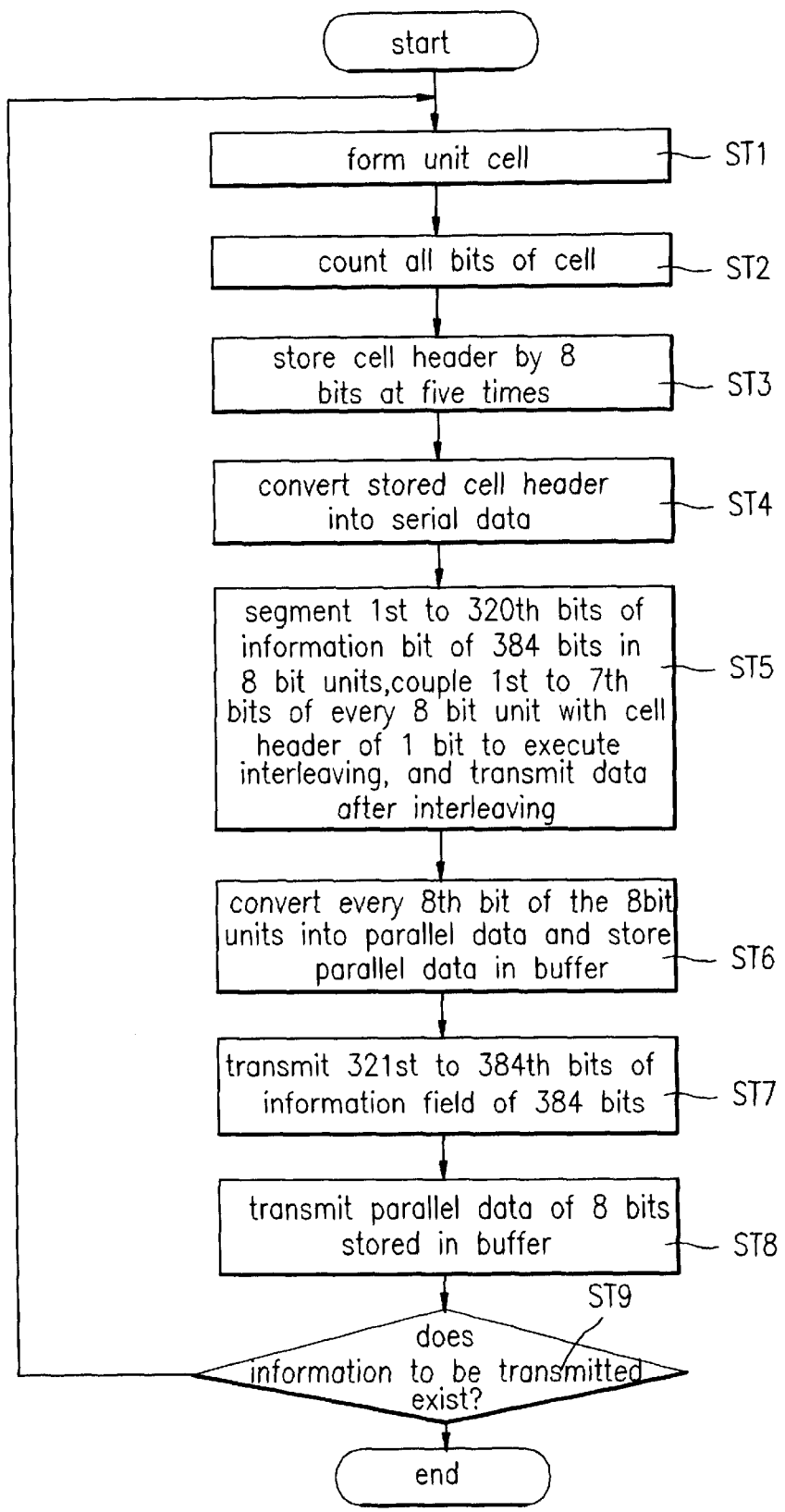
FIG. 5 is a flowchart illustrating a preferred embodiment of a cell interleaving method in the ATM switching system according to the present invention.

The cell interleaving operation of the cell header in the cell unit in the ATM switching system will now be described with reference to FIGS. 4 and 5. As shown in FIG. 4, the information to be transmitted is segmented sequentially in a block of 48 bytes, and the header of 5 bytes containing an address number is coupled to each block. Accordingly, the information to be transmitted comprises the cell 10, having a total of 53 bytes, as shown in step ST1 of FIG. 5.

Next, all bits of the cell 10, comprised of the cell header of 5 bytes and the information field of 48 bytes, are counted sequentially by the FPGA of the interleaving system. According to a preferred embodiment of the present invention, the FPGA can either be hardware or software controlled. The count of the bits is used to determine the transmission path of the corresponding bits, as shown in step ST2.

The 40 bits corresponding to the cell header of the unit cell 10 are counted in the FPGA, and are stored in the first buffer 20, at step ST3. These bits are sent to the first buffer 20 as eight (8) bit parallel data in 5 cycles. At this time, the cell header stored in the first buffer 20 is inputted in the stored order thereof to the parallel-to-serial converter 30, where it is converted into serial data (as depicted in FIG. 4) as shown in step ST4. The data in the serial form of 5 bytes are sequentially transmitted to the output controller 40 via the transmission path "a".

While the cell header of 5 bytes in the cell 10 is being stored in the first buffer 20, no data is outputted by the output controller 40. Therefore, a data transmission delay occurs until the 5 bytes of header data is transmitted to the output controller. It should be noted, however, that the transmission delay of the embodiment of the present invention is much less than the conventional transmission delay of 53 bytes.

At step ST5, after the cell header of 5 bytes in the cell 10 is transferred to the first buffer 20, the 1st to 320th bits of the information field of 384 bits are segmented in to groups of 8 bits. The 1st to 7th bits of every 8 bit group are transmitted to the output controller 40 via a data transmission line "S1." The output controller 40 sequentially couples the received 7 bits of each group with a corresponding 1 bit having a priority in the 40 bits being in a stand-by state in the parallel-to-serial converter 30. This is the primary interleaving.

The interleaved data consists of 5 groups of 8 bits. These groups of parallel data are outputted from the output controller in a sequential order. Thus, the interleaving for a total 40 bytes (inclusive of the cell header) is first executed, followed by the transmission of the 40 bytes.

At step ST6, concurrently, the 8th bit of each of the groups of 8 bits generated when the 1st to 320th bits of the information field of 384 bits were segmented in to 8 bit groups is transmitted to the serial-to-parallel converter 50. There, every 8th bit of data is combined with 7 other 8th bits of data, and it thus converted into parallel data of 8 bits. This data is sequentially stored in the second buffer 60.

However, the data of 5 bytes stored in the second buffer 60 and the information field from 321st to 384th bits(i.e. 8 bytes) remain without having any interleaving.

At step ST7, the 321st to 384th bits, i.e. 8 bytes, in the information field of the cell are transmitted sequentially to the output controller 40 via a data transmission line "S2." At this time, the output controller 40 disconnects the transmission lines "a" and "b" and outputs only the data of 8 bytes inputted through a transmission line "d."

Next, after the output controller 40 outputs the 321st to 384th bits in the information field of the unit cell 10, at step ST8, it disconnects a transmission line "d" and outputs the parallel data of 8 bits stored in the second buffer 60 in a sequential order via transmission line "c." Therefore, the single unit cell 70, which is interleaved, as shown in FIG. 4.

Next, the interleaving system of this embodiment of the present invention determines whether information to be transmitted still exists, at step ST9. If it exists, the above processes (steps ST1 to ST8) are repeated. If such information to be transmitted does not exist, the interleaving procedure is completed.

In communication systems where this embodiment of the ATM switching system is used, a plurality of subscribers may execute information transmission during the same time period. In such a case, the interleaved information is multiplexed and transmitted. The receiving side demultiplexes the information received, and deinterleaves it. It thus recovers the information in the form of the original signal.

As discussed above, a cell interleaving method in an ATM switching system according to a preferred embodiment of the present invention preferably comprises storing the cell header in a cell comprised of the cell header of 5 bytes and an information field of 48 bytes in a buffer, and outputting the entire data of 53 bytes in a sequential order, so as to execute the interleaving operation. Accordingly, the data for which the interleaving is executed cannot be transmitted only during the time the cell header of 5 bytes is stored, but can be sequentially transmitted after the storing time elapses.

Accordingly, the cell interleaving method in the ATM switching system has a minimum data transmission delay, thus ensuring that the speech quality can be improved in real time-based voice service or video service.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of interleaving cells in an asynchronous transfer mode (ATM) switching system, comprising the steps of:
    a) sequentially counting bits constituted for one or more ATM cell having a header field and an information field;
    b) storing bits corresponding to the header field;
    c) repeatedly segmenting bits corresponding to the information field in an n bit unit;
    d) sequentially coupling one bit of the header field stored in step b with 1st to (n−1)th bits in every n bit segment of the segmented information field in step c, and outputting the coupled result;
    e) transmitting only nth bits which have not b, en transmitted in the step d to the receiving side in a data unit; and
    f) transmitting bits which have not been transmitted in steps d and e to the receiving side.

2. The method of claim 1, wherein the counting in said step a) is done using one of software and hardware.

3. The method of claim 1, wherein the bits corresponding to the header field in said step b) are stored in a parallel data form and converted into serial data.

4. The method of claim 1, wherein n is 8.

5. The method of claim 1, wherein said one bit of the header field in said step d) is coupled with the nth bits in every n bits of the segmented information field.

6. The method of claim 1, wherein the nth bits in every n bit segment which have not been transmitted in said step e) are converted into parallel data and stored to be transmitted in an n bit parallel data unit.

7. The method of claim 1, wherein no bits are transmitted during said step b), for which the interleaving is executed at said steps c) to f).

8. The method as defined in claim 1, wherein steps b) through f) are repeatedly executed until the information to be transmitted is all transmitted, in case of one or more ATM cell in said step a).

9. An asynchronous transfer mode (ATM) switching system, comprising:

a first buffer for storing a header field of an ATM cell;

a first data converter to convert data outputted from the first buffer into a first format;

a second data converter to convert nth bits of n bit segments of an information field of the ATM cell into a second format;

a second buffer to store bits outputted from the second converter, and output the stored bits in the second format; and an output controller for sequentially coupling the bits of the header field stored in the first buffer with 1st to (n−1)th bits in the every n bits of the information field to thereby output the coupled result, outputting only nth bits which have not been outputted in a data unit, and outputting bits which correspond to the information field and have not been outputted.

10. The system of claim 9, wherein said n bit is 8 bits.

11. A method of interleaving data, comprising the steps of:

a) identifying a first group in the data having 40 bits;

b) identifying a second group in the data having 384 bits;

c) identifying a third group of data from the bits of the second group of data, the third group comprising 40 segments of 8 bits each;

d) sequentially combining 1st through 7th bits of each of the segments of the third group with individual bits of the first group to form 8 bit interleaved segments; and e) outputting the interleaved segments and all remaining bits.

12. The method of claim 11, further comprising the step of:

storing the first group in a first buffer after step a); and storing the 8th bit of the 40 segments of step c) in a second buffer after step d).

13. The method of claim 12, wherein the 8 bit interleaved segments are outputted first, the remaining bits of the second group are outputted second, and the bits stored in the second buffer are outputted third.

14. The method of claim 13, wherein the bits stored in the third group are converted to and outputted as parallel data.

15. The method of claim 11, wherein the first group corresponds to cell header data.

16. The method of claim 11, wherein the second group corresponds to cell information data.

17. A method of interleaving (x+y) bits of data, comprising the steps of:

a) identifying and storing a first group of data having x bits;

b) identifying a second group of data having y bits;

c) identifying a third group of data from the bits of the second group of data having x segments of n bits each;

d) sequentially combining every 1st through (n−1)th bit of each of the segments of the third group with individual bits of the first group, and outputting the sequentially combined groups;

e) storing an nth bit of each of the segments of the third group in a second buffer;

f) outputting the remaining bits of the second group; and g) outputting the bits from the second buffer.

18. The method of claim 17, wherein the first group corresponds to cell header data, and the second group corresponds to cell information data.

19. The method of claim 17, wherein x=40, y=384, and n=8.

20. The system of claim 9, wherein the header field and the information field are determined by counting the bits in the ATM cell.

21. The system of claim 20, further comprising a field programmable gate array to sequentially count bits in the ATM cell.

22. The system of claim 9, wherein the first data converter is a parallel-to-serial converter and the first format is serial data.

23. The system of claim 22, wherein the second data converter is a serial-to-parallel converter, and the second format is parallel data.

24. The system of claim 23, wherein the parallel data comprises segments of n bits of data.

* * * * *